3,361,850
PREVENTION OF COLD-FLOW IN ETHYLENE/ PROPYLENE/NON-CONJUGATED DIENE TERPOLYMERS
Charles A. Young, Wilmington, Del., assignor to E. I. du Pont de Nemours and Company, Wilmington, Del., a corporation of Delaware
No Drawing. Filed Sept. 11, 1964, Ser. No. 395,941
10 Claims. (Cl. 260—897)

ABSTRACT OF THE DISCLOSURE

A sulfur-curable composition comprising a rubber-like sulfur-curable α-olefin non-conjugated diene hydrocarbon copolymer blended with up to about 5% by weight of an ethylene polymer; said ethylene polymer containing at least 97% by weight ethylene units, having a density not greater than 0.93 and a melting point not greater than 120° C. The composition exhibits excellent resistance to cold flow during storage.

---

This invention relates to a novel composition and more particularly to a flow-resisting blend of a hydrocarbon elastomer and a branched ethylene polymer.

α-Olefin hydrocarbon elastomers are becoming an important article of commerce today for numerous applications such as hose, belts, coated fabrics, wire insulation and jacketing, soles and heels, sponges, and passenger tires. Representative examples of these polymers which display outstanding processing characteristics have Mooney viscosities in the range of about 10 to 100 (ML-4/212° F.). Unfortunately, some of these copolymers have presented certain undesirable handling problems. While uncured they tend to flow on storage. The problem has been most acute with the lowest viscosity grades, but even the higher viscosity types tend to exhibit this behavior during the warmer months of the year. For economic reasons it is preferred to store the raw copolymer in bags prior to use. Generally these bags are stacked to a level of at least several feet in the warehouses. During transportation to the customers, the bags are again frequently stacked one above the other in the transportation vehicle. During the storage and the transportation period the bags at the bottom of the piles have occasionally burst from the plastic flow of the polymer under the weight of the material above it.

It is an object of the present invention to provide a novel composition which is flow-resisting but which exhibits excellent processing and curing characteristics. A further object is to provide a method for reducing the undesired flow of hydrocarbon elastomers during storage and transportation prior to use. Other objects will appear hereinafter.

These and other objects of the present invention are accomplished by providing a composition comprising (a) a rubber-like α-olefin hydrocarbon polymer which exhibits plastic flow under ambient temperature and storage conditions and (b) up to about 5% by weight, based on the total weight of the composition, of an ethylene polymer having at least about 97% by weight ethylene units, having a density not greater than 0.93 and having a melting point no greater than about 120° C.

The essence of the present invention resides in the addition of an adjuvant amount, up to about 5% by weight, of a normally solid, ethylene polymer having at least about 97% by weight ethylene units, having a density not greater than 0.93 and having a melting point no greater than about 120° C. to a rubber-like α-olefin hydrocarbon polymer. It is quite surprising that the use of this rather minor amount of ethylene polymer brings about a dramatic improvement in resistance to flow of the elastomer.

Rubber-like α-olefin hydrocarbon polymers which may be used in preparing the novel compositions of the present invention are those elastomers which exhibit plastic flow to a perceptible degree under the conventional temperature and storage conditions employed in the rubber trade. In general, all uncured elastomers tend to undergo flow on storage. The magnitude of the effect will depend on factors such as the temperature and the nature of the polymer. The hotter the storage area is, the more a polymer will tend to flow. For a particular polymer, the lower its Mooney viscosity is, the more pronounced this effect may be. The flow is a result of pressure applied by the height of the polymer mass. The higher the mass, the greater the pressure. Since the polymer is plastic, i.e. will flow under pressure, it tends to undergo change of shape on storage. More particularly, these materials are sulfur-curable elastomers derived from at least one α-olefin and a non-conjugated diene. Repesentative α-olefins include ethylene, propylene, 1-butene, 1-heptene, 1-decene, etc. In general, these α-olefins contain from about 2 to 16 carbon atoms. Representative non-conjugated dienes include the aliphatic open-chain diolefins containing from 5 to 22 carbon atoms in which the double bonds are separated by more than 2 carbon atoms and in which at least one double bond is terminally located; dicyclopentadiene, a 5-alkenyl-substituted-2-norbornene; 5-methylene-2-norbornene, 2-alkyl-2,5-norbornadienes and cyclooctadiene. Hydrocarbon elastomers of these types are more particularly described in U.S. Patents 2,933,480, 3,000,866, 3,063,973, 3,093,620 and 3,093,621 and Belgian Patent 623,698 and the disclosures in these patents are specifically incorporated herein by reference. A particularly preferred elastomer to be employed in the present invention is a terpolymer of ethylene, another α-olefin, such as propylene, and an open chain aliphatic diene, such as 1,4-hexadiene. In general, the elastomers which are employed have a Mooney viscosity (ML-4/212° F.) in the range from about 10 to 100; higher Mooney stocks can be oil-extended to give compositions in this range.

As noted above, the ethylene polymer which is employed should have a melting point no greater than about 120° C. (determined by polarizing microscope technique); the temperature at which crystallinity finally disappears when the specimen is viewed between crossed Nicols on a hot-stage microscope; Sperati, C. A., Franta, W. A., and Starkweather, H. W., Jr., J. Am. Chem. Soc., 75, 6127–613 (1953); it should have a density no greater than about 0.93 g./cc. (ASTM Test Method D 1505–60T; sample conditioned therefor by slow cooling from the melt according to ASTM D 1928–62T, Procedure A); and it should contain at least about 97% by weight ethylene units. It is preferred that the melting point for the ethylene polymer range from about 108 to 120° C. and the density range from about 0.91 to 0.93. In addition, it is preferred that the ethylene polymer have a melt index ranging from about 0.1 to 100. The ethylene polymers which are useful in the present invention may be referred to as branched polymers. Quite surprisingly, the linear ethylene polymers are not suitable for use in the present invention. Instead of employing an ethylene homopolymer, one may use an ethylene copolymer. Representative copolymers include ethylene-vinyl acetate copolymers containing up to about 3% by weight of vinyl acetate units. The ethylene polymers which are employed are well known in the art and they can be made by any of the conventional procedures. As is well known, high pressures and non-metallic catalysts such as oxygen and peroxides or azo catalysts, are frequently employed. Such procedures are reviewed in "Polyolefin Resin Processess," by Marshall Sittig, Gulf Publishing Company, Houston, Tex., 1961, Chapter 7.

In general, it is only necessary to add up to about 5% by weight based on the total weight of the composition, of the ethylene polymer to the elastomer. Those skilled in the art can readily determine the optimum amount to use for a particular elastomer and a specified set of environmental conditions. In general, the higher the Mooney viscosity of the elastomer, the smaller the proportion of ethylene polymer need be to achieve the results desired. As can be seen from the representative examples given hereinafter, even a 0.1% concentration can be very effective. As the polymer viscosity decreases and the storage temperature increases, it is necessary to use somewhat greater proportions of the ethylene polymer.

The composition of the present invention can be prepared by any conventional mixing procedure. Dry mixing, for example, can be carried out on industrial rubber roll mills or internal mixers such as Banbury mixers and Struthers-Wells mixers. Alternatively, solutions of the elastomer and the ethylene polymer can be blended and the composition isolated thereafter by conventional methods such as drum drying.

The elastomer containing the adjuvant amount of the ethylene polymer is entirely storage stable and can be processed and vulcanized in the same manner as the corresponding elastomer containing no ethylene polymer. This is an outstanding feature of the present invention.

The following examples will better illustrate the nature of the present invention; however, the invention is not intended to be limited to these examples. Parts are by weight unless otherwise indicated.

EXAMPLE 1

Several types of polyethylene were blended with an ethylene/propylene/1,4-hexadiene terpolymer by milling for 15 minutes on a 6 inch by 12 inch mill with a roll temperature of 140–150° C. The terpolymer was prepared in tetrachloroethylene according to U.S. Patent 2,933,480 using a catalyst system of vanadyl trichloride and diisobutylaluminum chloride. The terpolymer contained about 40.5% by weight propylene units, 3.8% by weight hexadiene units and 55.7% by weight ethylene units and had a Mooney viscosity (ML-4/212° F.) of 54.

The flow characteristics of the blends were measured by applying a 2.25 lb. load to a 1.5 in. x 1.5 in. square x 0.87 in. high specimen of the blend, then holding the specimen under load for the desired time and temperature. The method applies an initial pressure of 1 p.s.i. to the specimen; this pressure is about equal to that produced by a block of elastomer 32 in. high. An aluminum rack containing a number of holes is used for the flow measurements. The blend specimen is centered beneath a hole in the rack, then a 2.5 in. x 2.5 in. aluminum plate weighing 20 g. is placed on top of the specimen, after which a 1 kg. brass weight, 2 in. diameter x 2.3 in. high, is placed on top of the plate. The aluminum surfaces in contact with the specimen are lubricated with a fluorocarbon wax. Two upper plates on the rack keep the brass weight in a vertical position and centered on top of the specimen. The percent decrease in height of the specimen during the test is termed the compression set. The results are given in Table I.

TABLE I

|  | Parts by Weight | | | | | |
|---|---|---|---|---|---|---|
| Terpolymer (ML-4/212° F.=54) | 100 | 99 | 98 | 97 | 96 | 95 |
| Branched polyethylene [1] |  | 1 | 2 | 3 | 4 |  |
| Linear polyethylene [2] |  |  |  |  |  | 5 |
| Compression Set (percent): |  |  |  |  |  |  |
| After 3 hr. at 60° C | 60 | 50 | 41 | 33 | 25 | 54 |
| After 72 hr. at 25° C | 60 | 42 | 30 | 23 | 18 | 50 |

[1] Density=0.92 g./cc.; Melting point=112° C.; Melt Index=1.9. This polymer was prepared according to the procedure in U.S. Patent 2,897,183.
[2] Density=0.96 g./cc.; Melting point=135° C.; Melt Index=3.8. This polymer was prepared according to the procedure in U.S. Patent 2,862,917.

These results demonstrate that small amounts of branched polyethylene were effective in reducing the rate and extent of flow under a constant load during storage at 25° C. and 60° C. Linear polyethylene, on the other hand, was relatively ineffective. Other branched polyethylenes having a density of 0.91 to 0.93 g./cc. and a melting point not greater than 120° C. give similar improvement in flow resistance when used in place of the branched polyethylene described in the above table. Moreover, a branched ethylene (97.5%)/vinyl acetate (2.5%) copolymer (density=0.925 g./cc.; melting point=108° C.; melt index=0.5, prepared according to the procedure in U.S. Patent 3,029,230) may be used in place of branched polyethylene to obtain a similar improvement.

EXAMPLE 2

An ethylene/propylene/1,4-hexadiene terpolymer (ML-4/212° F.=80; weight percent propylene=39, weight percent diene=3.8), prepared in tetrachloroethylene according to U.S. Patent 2,933,480 using a catalyst system of vanadyl trichloride and diisobutylaluminum chloride, was blended with small amounts of branched polyethylene by the procedure described in Example 1. Cylindrical pellets 1.6 in. diameter x 0.97 in. high were molded from the starting terpolymer and from the blends with polyethylene. Flow measurements made by the methods described in Example 1 gave the following results:

TABLE II

|  | Parts by weight | | | | |
|---|---|---|---|---|---|
| Terpolymer (ML-4/212° F.=80) | 100 | 99.9 | 99.75 | 99.5 | 99.0 |
| Branched Polyethylene (Density=0.92 g./cc.; Melting Point=112° C.; Melt Index=1.9) |  | 0.1 | 0.25 | 0.5 | 1.0 |
| Compression Set (percent): |  |  |  |  |  |
| After 3 hr. at 60° C | 50 |  | 40 | 35 | 22 |
| After 72 hr. at 25° C | 45 | 34 | 19 | 11 | 8 |

It is evident from this table that even 0.1 part of branched polyethylene in the terpolymer has produced a noticeable improvement in flow resistance.

EXAMPLE 3

Three parts of branched polyethylene (density=0.92 g./cc.; melting point=112° C.; melt index=1.9) was blended with a variety of hydrocarbon elastomers by the method described in Example 1. Cylindrical pellets 1.6 in. diameter x 0.97 in. high were molded from the elastomers, and flow measurements were performed by the procedure described in Example 1, except that the initial load was varied between 1.15 p.s.i. and 2.3 p.s.i., depending on the stiffness of the elastomer. The improved flow resistance caused by 3% branched polyethylene is shown by the following table. Hydrocarbon elastomer A is a terpolymer of ethylene, propylene and 5-methylene-2-norbornene having about 41% by weight propylene units and about 3.7% by weight norbornene units and is prepared according to the procedure in U.S. Patent 3,093,621. The terpolymer has a Mooney viscosity (ML-4/212° F.) of 47.

Hyrocarbon Elastomer B is a terpolymer of ethylene, propylene and dicyclopentadiene having about 37% by weight propylene units and about 5% by weight dicyclopentadiene units and is prepared according to the procedure in U.S. Patent 3,000,866. The terpolymer has a Mooney viscosity (ML-4/212° F.) of 52.

Hydrocarbon Elastomer C is similar to B in that it is a terpolymer of ethylene, propylene and dicyclopentadiene having about 46.5% by weight propylene units and about 5% dicyclopentadiene units and is also prepared according to the procedure in U.S. Patent 3,000,866. This terpolymer has a Mooney viscosity (ML-4/212° F.) of 66.

Hydrocarbon Elastomer D is a terpolymer of ethylene, propylene and 1,5-cyclooctadiene having about 51.5% by weight propylene units and about 2.9% by weight cyclooctadiene units and is prepared according to the procedure in Belgian Patent 623,698. The terpolymer has a Mooney viscosity (ML-4/212° F.) of 37.

TABLE III

|  | Parts by Weight | | | | | | | |
|---|---|---|---|---|---|---|---|---|
| Hydrocarbon Elastomer A | 100 | 97 | | | | | | |
| Hydrocarbon Elastomer B [1] | | | 100 | 97 | | | | |
| Hydrocarbon Elastomer C | | | | | 100 | 97 | | |
| Hydrocarbon Elastomer D | | | | | | | 100 | 97 |
| Branched Polyethylene | | 3 | | 3 | | 3 | | 3 |
| Initial Load During Flow Tests (p.s.i.) | 1.15 | 1.15 | 2.3 | 2.3 | 2.3 | 2.3 | 1.15 | 1.5 |
| Compression Set (percent): | | | | | | | | |
| After 3 hr. at 60° C | 51 | 14 | 11 | 3 | 25 | 16 | 24 | 5 |
| After 72 hr. at 25° C | 48 | 10 | | | 19 | 7 | 16 | 6 |

[1] Contains 20 phr. of naphthenic hydrocarbon oil (Circosol 2XH).

EXAMPLE 4

An ethylene/propylene/1,4-hexadiene terpolymer was employed displaying a Mooney viscosity (ML-4/212° F.) of 55 and having the following monomer unit concentration by weight: ethylene, about 51.7%; propylene, about 45%; 1,4-hexadiene, about 3.3%. It was prepared in tetrachloroethylene in accordance with the general procedures of U.S. Patent 2,933,480 in the presence of a coordination catalyst made from vanadyl trichloride and diisobutylaluminum monochloride. This terpolymer was blended on a rubber roll mill with the branched polyethylene of Example 1 (having a density of 0.92 and a melting point of 112° C.) in accordance with the formulation set out in Table IV-1 below. For purpose of comparison a control outside the scope of this invention was also made:

TABLE IV-1

| Compound | Parts by Weight | |
|---|---|---|
|  | Stock A | Stock B [1] |
| Terpolymer | 97 | 100 |
| Polyethylene | 3 | 0 |
| Zinc Oxide | 5 | 5 |
| Stearic Acid | 1 | 1 |
| HAF Carbon Black | 80 | 80 |
| Naphthenic Petroleum Oil | 40 | 40 |
| 2-mercaptobenzothiazole | 0.5 | 0.5 |
| Tetramethylthiuram Monosulfide | 1.5 | 1.5 |
| Sulfur | 1.5 | 1.5 |

[1] Control.

Both stocks were then cured in a press at 160° C. for 20 minutes. The vulcanizates displayed the following properties:

TABLE IV-2

|  | Stock A | Stock B [1] |
|---|---|---|
| Stress Strain at 25° C.: | | |
| Modulus at 300% Extension (p.s.i.) | 1,300 | 1,370 |
| Tensile Strength (p.s.i.) | 2,480 | 2,510 |
| Extension at Break (percent) | 460 | 440 |
| Shore A Hardness | 59 | 61 |
| Yerzley Resilience: | | |
| At 25° C. (percent) | 37 | 37 |
| At 100° C. (percent) | 54 | 54 |
| Compression Set: 22 hrs. at 70° C. (percent) (Method B) | 17 | 18 |
| Heat Build-up (Goodrich Flexometer, 3/16 inch stroke, 20 min. test period): | | |
| Δ C (mils) | 71 | 54 |
| Δ T (° C.) | 82 | 75 |
| Final Center T (° C.) | 161 | 158 |

[1] Control.

The properties of the Stock A vulcanizate are essentially the same, within the limits of the experimental scatter normally encountered, as those of the control.

As many widely different embodiments of this invention may be made without departing from the spirit and scope thereof, it is to be understood that this invention is not limited to the specific embodiments thereof except as defined in the appended claims.

What is claimed is:

1. A sulfur-curable composition comprising a rubber-like sulfur-curable hydrocarbon copolymer prepared by copolymerizing at least one α-monoolefin of about 2–16 carbon atoms with a non-conjugated diene of about 5–22 carbon atoms which exhibits plastic flow under ambient temperature and storage conditions and an effective amount up to about 5% by weight based on the total weight of the composition, of an ethylene polymer having at least about 97% by weight ethylene units, having a density not greater than 0.93 and having a melting point not greater than 120° C.

2. A sulfur-curable composition comprising a rubber-like α-olefin hydrocarbon polymer having a Mooney viscosity of from about 10 to 100, said polymer being a sulfur-curable terpolymer of ethylene, another α-olefin of about 3–16 carbon atoms and a non-conjugated diene of about 5–22 carbon atoms and an effective amount up to about 5% by weight based on the total weight of the composition, of an ethylene polymer having at least about 97% by weight ethylene units, having a density not greater than 0.93 and having a melting point not greater than 120° C.

3. The composition of claim 2 wherein the hydrocarbon polymer is a sulfur-curable terpolymer of ethylene, propylene and 1,4-hexadiene and the ethylene polymer is a homopolymer of ethylene.

4. The composition of claim 2 wherein the hydrocarbon polymer is a sulfur-curable terpolymer of ethylene, propylene and dicyclopentadiene and the ethylene polymer is a homopolymer of ethylene.

5. The composition of claim 2 wherein the hydrocarbon polymer is a sulfur-curable terpolymer of ethylene, propylene and 5-methylene-2-norbornene and the ethylene polymer is a homopolymer of ethylene.

6. The composition of claim 2 wherein the ethylene polymer is used in an amount of about 1 to 5% by weight based on the total weight of the composition.

7. The composition of claim 2 wherein the ethylene polymer is used in an amount of about 0.1–5% by weight based on the total weight of the composition.

8. The composition of claim 2 wherein the ethylene polymer has a melt index of about 0.1–100.

9. The process of preventing the plastic flow of an uncured, rubber-like, sulfur-curable α-olefin hydrocarbon terpolymer of ethylene, another α-olefin of about 3–16 carbon atoms and a non-conjugated diene of about 5–22 carbon atoms which exhibits plastic flow under ambient temperature and storage conditions comprising blending said terpolymer with an effective amount up to about 5% by weight based on the total weight of the composition of an ethylene polymer having at least about 97% by weight ethylene units, having a density not greater than 0.93 and having a melting point not greater than 120° C.

10. The process of claim 9 wherein the ethylene polymer has a melt index of about 0.1–100.

References Cited

UNITED STATES PATENTS

| 3,225,122 | 12/1965 | Stumpe | 260—894 |
| 3,244,773 | 4/1966 | Crouch | 260—894 |

(Other references on following page)